US010998984B2

(12) United States Patent
Tonolini et al.

(10) Patent No.: US 10,998,984 B2
(45) Date of Patent: May 4, 2021

(54) METHODS AND APPARATUS FOR CROSS-MEDIUM COMMUNICATION

(71) Applicant: Massachusetts Institute of Technology, Cambridge, MA (US)

(72) Inventors: Francesco Tonolini, London (GB); Fadel Adib, Cambridge, MA (US)

(73) Assignee: Massachuusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/396,731

(22) Filed: Apr. 28, 2019

(65) Prior Publication Data

US 2019/0342012 A1 Nov. 7, 2019

Related U.S. Application Data

(60) Provisional application No. 62/667,323, filed on May 4, 2018.

(51) Int. Cl.
*H04B 13/02* (2006.01)
*H04B 11/00* (2006.01)
*G01S 1/74* (2006.01)

(52) U.S. Cl.
CPC .............. *H04B 13/02* (2013.01); *G01S 1/74* (2013.01); *H04B 11/00* (2013.01)

(58) Field of Classification Search
CPC .......... G01S 13/583; G01S 13/86; G01S 1/74; G01S 7/003; G01S 7/415; H04B 11/00; H04B 13/02
See application file for complete search history.

(56) References Cited

U.S. PATENT DOCUMENTS 4,843,597 A * 6/1989 Gjessing .................. G01H 9/00
342/22
4,995,101 A 2/1991 Titterton et al.
(Continued)

FOREIGN PATENT DOCUMENTS

CN 103475427 A * 12/2013
RU 2640577 C2 * 1/2018

OTHER PUBLICATIONS

Huang Haining; CN-103475427-A Translation (Year: 2013).*
(Continued)

*Primary Examiner* — Tan H Trinh
*Assistant Examiner* — Erica L Fleming-Hall
(74) *Attorney, Agent, or Firm* — Stephen R. Otis

(57) ABSTRACT

An underwater transmitter may generate underwater pressure waves that encode bits of data. The pressure waves may travel to, and created minute vibrations in, the water's surface. An airborne radar may detect radar signals that reflect from the water's surface. The surface vibrations may modulate the phase of the reflected radar signal. The radar receiver may, based on the variation in the phase of the reflected radar signal, decode the data that was initially encoded in the underwater pressure waves. The underwater pressure waves may be frequency modulated, such as by orthogonal frequency-division multiplexing. Alternatively, the surface vibrations may be detected by a camera, interferometer or other light sensor. Alternatively, the pressure waves may propagate through a media other than water. For instance, the pressure waves may propagate through bodily tissue, or may propagate through oil or a liquid fracking mixture in an oil or gas well.

2 Claims, 6 Drawing Sheets

(56) References Cited

U.S. PATENT DOCUMENTS

| | | | | |
|---|---|---|---|---|
| 5,315,561 | A * | 5/1994 | Grossi | G01S 13/0209 |
| | | | | 342/22 |
| 6,058,071 | A | 5/2000 | Woodall et al. | |
| 6,466,157 | B1 * | 10/2002 | Bjornholt | G01S 7/032 |
| | | | | 340/545.3 |
| 6,738,011 | B1 * | 5/2004 | Evans | G01S 7/18 |
| | | | | 342/26 C |
| 7,877,059 | B2 | 1/2011 | Rhodes et al. | |
| 8,515,343 | B2 | 8/2013 | Rhodes et al. | |
| 8,834,364 | B2 | 9/2014 | Heneghan et al. | |
| 2006/0109161 | A1 * | 5/2006 | Krikorian | G01S 13/90 |
| | | | | 342/25 B |
| 2007/0223311 | A1 * | 9/2007 | Carof | G01S 15/60 |
| | | | | 367/94 |
| 2008/0037370 | A1 * | 2/2008 | Crowell | H04B 11/00 |
| | | | | 367/127 |
| 2010/0290063 | A1 * | 11/2010 | Bakhtiari | A61B 5/0507 |
| | | | | 356/614 |
| 2011/0066380 | A1 * | 3/2011 | Hager | E21B 41/0064 |
| | | | | 702/8 |
| 2011/0102177 | A1 * | 5/2011 | Johnson | H04B 11/00 |
| | | | | 340/540 |
| 2012/0147700 | A1 * | 6/2012 | Frivik | G01V 1/3835 |
| | | | | 367/19 |
| 2014/0085127 | A1 * | 3/2014 | Kishigami | G01S 13/91 |
| | | | | 342/108 |
| 2015/0134712 | A1 * | 5/2015 | Yamada | G01R 33/56545 |
| | | | | 708/200 |
| 2016/0050030 | A1 * | 2/2016 | Riedl | H04B 11/00 |
| | | | | 367/133 |
| 2017/0255720 | A1 * | 9/2017 | Satoh | G01W 1/10 |
| 2017/0258332 | A1 * | 9/2017 | Wynn | A61B 5/0095 |
| 2018/0145770 | A1 * | 5/2018 | Oelze | H04B 11/00 |
| 2018/0259618 | A1 * | 9/2018 | Jales | G01S 7/023 |
| 2018/0356509 | A1 * | 12/2018 | Haghighi | G01S 7/41 |

OTHER PUBLICATIONS

W. R. Scott Jr, C. T. Schröder, and J. S. Martin, "A hybrid acousto/electromagnetic technique for locating land mines," in Proc. Int. Geosci. Remote Sensing Symp., Seattle, WA, Jun. 1998, pp. 216-218. (Year: 1998).*

Cherenkov Anatolij Vladimirovich, RU-2640577-C2 Translation, Jan. 2018 (Year: 2018).*

Adib, F., et al., Demo: real-time breath monitoring using wireless signals; published in Proceedings of the 20th annual international conference on mobile computing and networking, MobiCom'14, pp. 261-262, Sep. 2014.

Adib, F., et al., 3D tracking via body radio reflections; published in Proceedings of the 11th USENIX Conference on Networked Systems Design and Implementation, NSDI'14, pp. 317-329, Apr. 2014.

Brumbi, D., Low power FMCW radar system for level gaging; published in 2000 IEEE MTT-S International Microwave Symposium Digest (Cat. No. 00CH37017), Jun. 2000.

Girao, P., et al., Microwave Doppler radar in unobtrusive health monitoring; published in Journal of Physics: Conference Series, vol. 588, conference 1; 2015.

Guohua, L., et al., Study of the Ballistocardiogram signal in life detection system based on radar; published in : 2007 29th Annual International Conference of the IEEE Engineering in Medicine and Biology Society, year 2007.

Lee, F., et al., Implementation and test of ISiMI100 AUV for a member of AUVs Fleet; published in OCEANS 2008, Sep. 2008.

Li, Z., Millimeter Wave Radar for detecting the speech signal applications; published in International Journal of Infrared and Millimeter Waves, vol. 17, Issue 12, pp. 2175-2183, Dec. 1996.

Puschell, J., et al., The Autonomous Data Optical Relay Experiment: first two way laser communication between an aircraft and submarine; published in [Proceedings] NTC-92: National Telesystems Conference, May 1992.

Rahul, H., et al., Frequency-aware rate adaptation and MAC protocols; published in Proceedings of the 15th annual international conference on Mobile computing and networking (MobiCom '09), pp. 193-204, Sep. 20, 2009.

Scott, W., et al., Experimental model for a seismic landmine detection system; published in IEEE Transactions on Geoscience and Remote Sensing, vol. 39 , Issue 6, pp. 1155-1164, Jun. 2001.

Stojanovic, M., Underwater acoustic communications; published in Proceedings of Electro/International 1995, Jun. 1995.

Stojanovic, M., On the relationship between capacity and distance in an underwater acoustic communication channel; published in Proceedings of the 1st ACM international workshop on underwater networks, WUWNet '06, pp. 41-47, Sep. 2006.

Stojanovic, M., OFDM for underwater acoustic communications: Adaptive synchronization and sparse channel estimation; published in 2008 IEEE International Conference on Acoustics, Speech and Signal Processing, 2008.

Yoshida, H., et al., Study on land-to-underwater communication; published in 2011 The 14th International Symposium on Wireless Personal Multimedia Communications (WPMC), Oct 2011.

Zhang, J., et al., Design of time delayed control systems in UAV using model based predictive algorithm; published in 2010 2nd International Asia Conference on Informatics in Control, Automation and Robotics (CAR 2010), Mar. 2010.

* cited by examiner

```
Algoritym Transmitting through a TARF Channel
POWER ALLOCATION
▷ Path Loss Estimation
  Estimate depth; r ← p/ρ_w g
  Estimate path-loss PL(ω)
▷ Power Distribution
  Solve for level μ from Eq. 7
  Compute power allocation: P(ω) ← (μ − C(ω))⁺
▷ MODULATION
▷ SNR Estimation
  Estimate SNR per subcarrier: SNR(ω) ← P(ω) x 10^(PL(ω)/10)
▷ Modulation
if SNR(ω) <= SNR₁
    Mod(ω) ← BPSK
elseif SNR₁ < SNR(ω) <= SNR₂
    Mod(ω) ← QPSK
elseif SNR₂ < SNR(ω) <= SNR₃
    Mod(ω) ← 16QAM
else
    Mod(ω) ← 64QAM
TRANSMISSION
▷ Add preamble, cyclic prefix, CRC
▷ Transmit
```

FIG. 4A

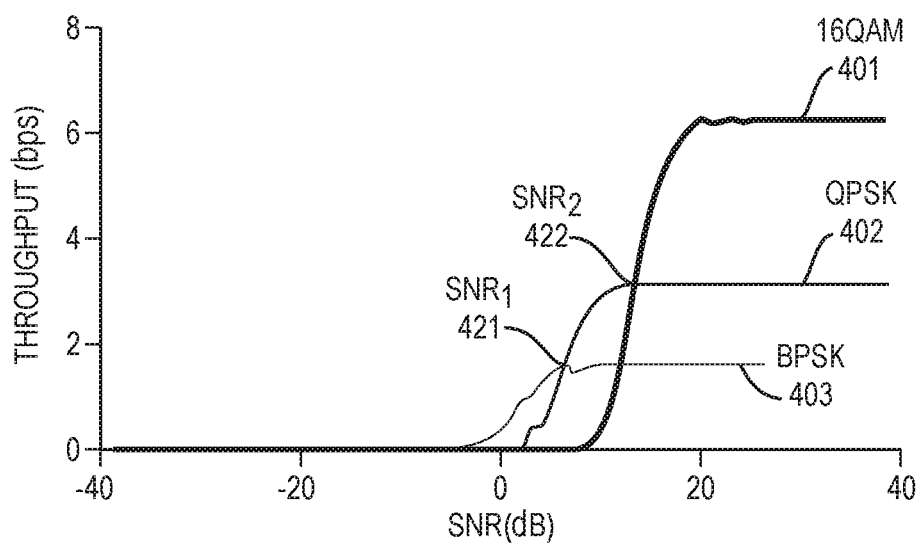

FIG. 4B

METHODS AND APPARATUS FOR CROSS-MEDIUM COMMUNICATION

RELATED APPLICATIONS

This application claims the benefit of U.S. Provisional Application No. 62/667,323 filed May 4, 2018 (the "Provisional").

STATEMENT REGARDING FEDERALLY SPONSORED RESEARCH OR DEVELOPMENT

This invention was made with government support under Grant No. CNS-173972 awarded by the National Science Foundation. The government has certain rights in the invention.

FIELD OF TECHNOLOGY

The present invention relates generally to communication systems.

BACKGROUND

Conventional technologies exist for sending data from an underwater node to a node that is above the water. However, these conventional approaches have major drawbacks.

In deep-sea exploration, a fleet of AUVs (autonomous underwater vehicles) may act as data mules. These AUVs may dive deep into the ocean to collect data from underwater sensors, then rise to the ocean surface to transmit radio signals that encode the collected data, and then repeat the cycle over and over again. Yet this AUV approach is time-consuming and costly, particularly in offshore oil exploration which requires scanning vast areas of the seabed and where searching for and establishing a single deep-sea well can cost more than $100 million.

A military submarine may rise to the ocean's surface (or at least raise an antenna above the ocean's surface) in order to transmit a radio signal. But doing so may reveal the submarine's position and expose it to attack by hostile forces.

Another approach is to use a network of partially submerged relay buoys. Each buoy may include both a submerged hydrophone that detects an underwater acoustic signal and an above-water antenna that transmits a radio signal. Each buoy may thus relay, via the radio signal, data that was in the underwater acoustic signal. However, a stationary network of partially submerged buoys is not well-suited for submarines, which may roam through vast regions of an ocean.

The US and Soviet navies developed ELF (extremely low frequency) communication systems which operate at 30-300 Hz and are capable of communicating across the air-water boundary. However, due to their very long wavelengths, ELF systems typically require kilometers-long antennas, which make them infeasible to incorporate into underwater vehicles. Thus, a submerged craft cannot use ELF communication to transmit a signal across the water-air barrier. ELF communication is only one-way, from a land-based transmitter to the submerged craft.

Conventional technologies are not able to transmit a wireless signal from an underwater node across the water-air surface to a receiver that is located above the surface.

SUMMARY

In some implementations of this invention, a communication system sends encoded wireless signals from a underwater node, through the water-air surface, to a node that is located above the surface.

In some implementations, an underwater transducer (speaker) generates sound signals that comprise longitudinal pressure waves. These underwater pressure waves travel to, and cause minute vibrations of, the water-air surface. A radar transceiver transmits radar signals that travel to, and reflect from, the water-air surface. The minute vibrations of the water's surface (caused by the pressure waves) in turn modulate the phase of the radar signals that reflect from the surface. The radar transceiver detects the modulations of phase of the reflected radar signals. A computer determines, based on these modulations of phase, the displacements of the water-air surface that are caused by the underwater pressure waves.

The underwater sound signal may be frequency modulated to encode bits of data. This in turn may cause the vibrations of the water-air surface, and the modulations of phase of the reflected radar signal, to be frequency modulated. For instance, the modulation may comprise OFDM (orthogonal frequency-division multiplexing). A computer may decode the modulations of phase of the reflected radar signal, to determine the bits of data that were initially encoded by the underwater sound signal.

In some implementations, a computer separates the radar reflections into different range bins, and selects the range bin that corresponds to the water-air surface. The water-air surface may have the largest radar cross-section, and thus the range bin that corresponds to the water-air surface may have the largest reflected signal power. The computer may unwrap phase of the radar reflections in this range bin, and then apply a bandpass or highpass filter to eliminate lower frequencies due to surface wind waves. For instance, the underwater pressure waves (and the minute vibrations of the water-air surface caused by the pressure waves) may have frequencies between 100 Hz and 200 Hz, whereas the wind waves may have a frequencies between 0.1 Hz to 3 Hz.

Filtering out the effect of the surface wind waves may be highly desirable, because otherwise wind waves may mask the surface vibrations caused by the underwater sound. This is because the surface vibrations may be very small (e.g., between 2 microns and 40 microns peak-to-peak displacement), whereas surface wind waves may be 3 to 6 orders of magnitude larger. For instance, surface waves caused by wind may have peak-to-peak displacements that are 100,00 times larger than those of the vibrations caused by the sound signals.

In some implementations, the radar comprises a millimeter wave FMCW (frequency modulated continuous wave) radar. For instance, the millimeter wave radar may transmit radar signals at a center frequency of 60 GHz with a bandwidth 3 GHz, with a wavelength of approximately 5 cm, and a phase sensitivity of 1.25 radians per millimeter. Due to the small wavelength, even surface displacements of few microns may cause detectable phase changes of a few degrees, enabling the radar to sense and decode very minute surface vibrations.

In some implementations, the underwater pressure waves are frequency modulated, and a so-called waterfilling algorithm is performed to determine optimal allocation of power among the different frequency channels. For instance, in some cases, OFDM modulation is performed, and a waterfilling calculation determines optimal power allocation among frequency subcarriers.

In some implementations, the underwater transmitter includes a pressure sensor that takes pressure measurements. These pressure measurements may be employed to estimate attenuation in the communication channel, even without feedback from the airborne radar. Specifically, depth of the underwater transmitter below the surface may be estimated based on pressure measurements taken by the pressure sensor. The depth (distance to the surface) may be employed as a proxy for the attenuation of the underwater sound, because the amount of attenuation of the underwater sound depends on the distance traveled through the water. This attenuation of the underwater sound may be the dominant pathloss component in the end-to-end communication channel (from underwater speaker to airborne radar. Thus, based on the pressure readings, the underwater transmitter may estimate attenuation of the channel, even without feedback from the airborne radar.

In some implementations, the underwater transmitter adaptively varies the bitrate or coding rate. The underwater transmitter may vary the bitrate (or coding rate) based on estimated channel attenuation (which is estimated based on pressure readings). In some use scenarios, the underwater transmitter transmits an underwater sound signal that encodes bits at bitrates up to 400 bps.

In some implementations, the underwater speaker adaptively varies modulation schemes. For instance, the underwater transmitter may estimate signal-to-noise ratio (SNR) for each frequency channel. The underwater transmitter: (a) may employ different modulation methods (such as BPSK, QPSK, 16QAM and 64QAM) for different frequency subcarriers; and (b) may select the modulation method for a given frequency channel based on the estimated SNR of the given frequency channel.

In some implementations, the SNR for each frequency channel is estimated as follows: Pathloss and SNR for a particular frequency channel may depend on (a) the frequency, (b) the depth of the underwater transmitter below the water's surface, (c) the height of the airborne radar above the surface; (d) the water density; and (e) the speed of sound in water. The depth may be determined from water pressure measurements. The height of the airborne radar may be known. The water density and speed of sound in water may depend on water conditions (e.g., temperature and salinity) that may be measured or accurately estimated.

In some implementations, the communication channel undergoes frequency-selective fading that is inversely proportional to the transmit acoustic frequency. The underwater speaker may take this frequency-selective fading into account when selecting a power- and rate-optimal modulation scheme across the operational bandwidth.

In some cases, a computer analyzes variations in RF reflections and uses them to decode the bits communicated by an underwater node. Thus, communication may be achieved by a translation between acoustic signals and the RF reflections.

The above discussion involved underwater sound signals, vibrations of the air-water surface, and radar that detects the vibrations.

Alternatively, the sound signals may be transmitted through any other media. For instance, the sound signals may propagate through bodily tissue and cause skin to vibrate. This may enable a sensor that is implanted deep in bodily tissue to transmit its readings to the outside world. Or, for instance, the sound signals may propagate through liquid (e.g., oil or a fracking mixture) in an oil or gas well, to enable communication from a sensor that is located far underground in the well.

Alternatively, technologies other than radar may be employed to detect the vibrations of the surface. For instance, a camera, interferometer or other light sensor may detect variations in reflected light from the surface, where the variations are due to surface vibrations caused by the sound signal. In some cases, the reflections are reflections of only ambient light. In other cases, an active light source (e.g., a laser) emits light (e.g., visible, ultraviolet or infrared light) that reflects from the surface.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

BRIEF DESCRIPTION OF THE DRAWINGS

FIG. 4A shows an algorithm for transmission.

FIG. 4B is a chart that illustrates throughput-SNR curves.

The above Figures are not necessarily drawn to scale. The examples shown in the above Figures do not limit this invention. This invention may be implemented in many other ways.

DETAILED DESCRIPTION

General

In some implementations of this invention, an underwater acoustic transducer wirelessly communicates with airborne radar that is located above the water's surface.

In some implementations, a communication system comprises: (1) an underwater acoustic transmitter; and (2) a radar transceiver located over the water.

The acoustic transmitter may comprise an acoustic transducer (e.g., underwater speaker) that transmits a signal that encodes packets of data. The underwater acoustic signal may be in the 100-200 Hz frequency range, because signals in that frequency range may undergo relatively low attenuation in water and may achieve long travel distances in water.

The acoustic signal may travel as a pressure wave inside the water. When the pressure wave hits the water surface, it may cause a surface displacement that is proportional to the pressure wave.

In some cases, the radar transceiver comprises a millimeter-wave FMCW (frequency modulated continuous wave) radar. The radar may transmit a wideband signal (centered around 60 GHz) and may measure its reflection off the water's surface. As the water surface vibrates due to the acoustic pressure waves, these vibrations may modulate the phase of the reflected signal. The radar may measure these phase changes and decode them in order to recover the transmitted packets.

In some implementations, underwater sensors wirelessly communicate with compact airborne nodes. The communication may utilize the water-air boundary (which has been traditionally considered an obstacle for communication) as a communication interface.

In some implementations, the communication system performs wireless communication from one or more underwater nodes to one or more airborne nodes.

This invention has many practical applications, including deep-sea exploration, submarine communication, and search and recovery. For instance, this invention may facilitate deep-sea exploration, by enabling underwater sensors to transmit sensor data to a transceiver located above the water. Or for instance, this invention may enable a drone to fly over large areas while receiving data from a network of deployed underwater nodes. Likewise, this invention may enable submarines to transmit information to airplanes without the need for surfacing or compromising their locations. Furthermore, this invention may facilitate finding vehicles that go missing underwater (e.g., missing airplanes). For example, a missing vehicle may continuously send distress signals to the surface, which may be detected from the air, enabling rapid airborne search for submerged missing vehicles.

Figure 1A:
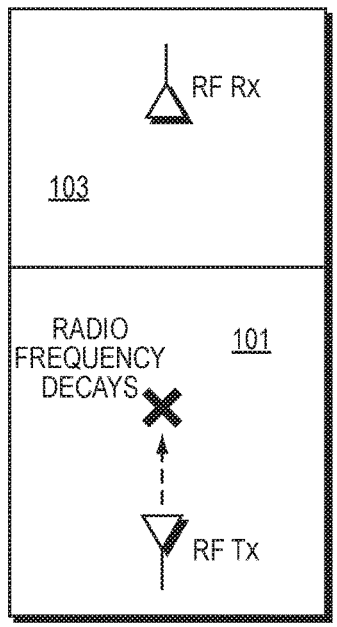
FIG. 1A shows a radio frequency signal that decays rapidly in water.

It is useful to compare the present invention to other possible approaches, as follows:

In some implementations of this invention, an underwater acoustic speaker transmits an acoustic pressure wave signal. In contrast, it would be infeasible for an underwater radio transmitter to transmit radio frequency (RF) electromagnetic signals to an airborne radio receiver. This is because—as shown in FIG. 1A—the power of an RF electromagnetic signal decays very rapidly when propagating through water 101.

Figure 1B:
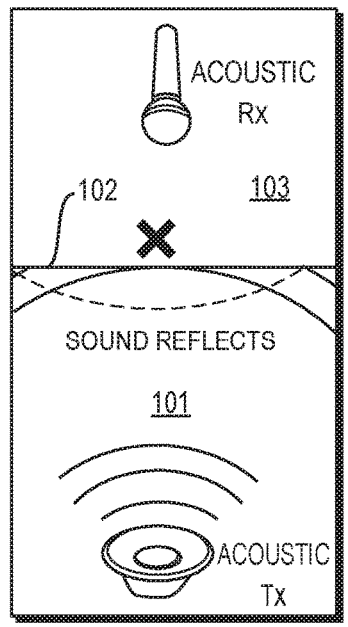
FIG. 1B shows an underwater acoustic signal that reflects from the water's surface.

In some implementations of this invention, an airborne radar detects vibrations of the water-air surface that are caused by an acoustic signal transmitted by an underwater loudspeaker. In contrast, it would be typically be infeasible for an airborne microphone to detect and decode an acoustic signal transmitted by an underwater loudspeaker. This is because: (a) the underwater acoustic wave is mostly reflected by the water-air surface 102, as shown in FIG. 1B, and (b) acoustic signals decay rapidly in air 103.

Figure 1C:
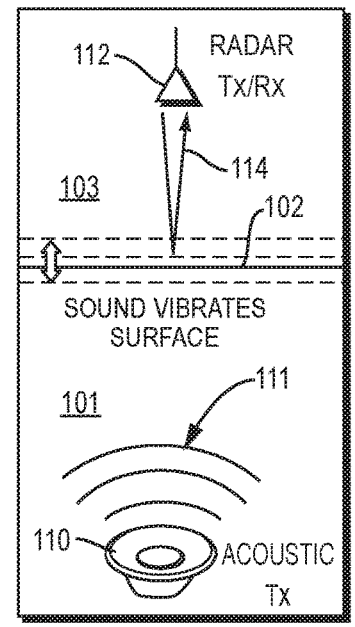
FIGS. 1C and 2A illustrate an end-to-end communication.
Figure 2A:
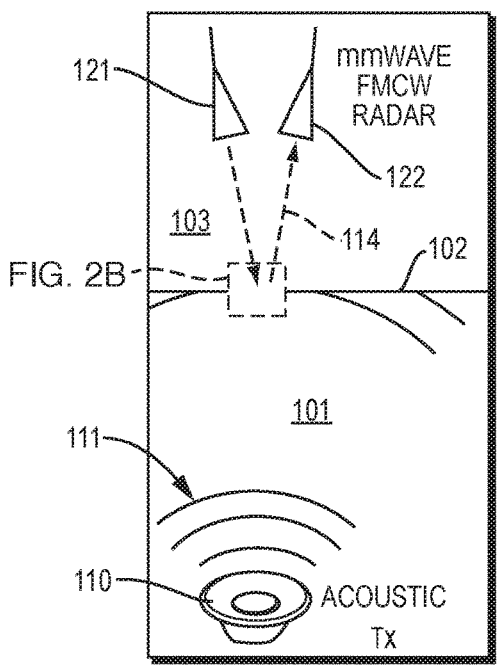

FIGS. 1C and 2A illustrate communication, in an illustrative implementation of this invention. In the examples shown in FIGS. 1C and 2A, an underwater acoustic transducer (loudspeaker) 110 generates sound (pressure) waves 111. These underwater pressure waves travel to, and cause vibrations of, the water-air surface 102. A millimeter wave FMCW radar transceiver 112 transmits radar signals that travel to, and reflect from, the water-air surface. In FIG. 2A, the radar transceiver includes a transmitter horn antenna 121 and a receiver horn antenna 122.

Figure 2B:
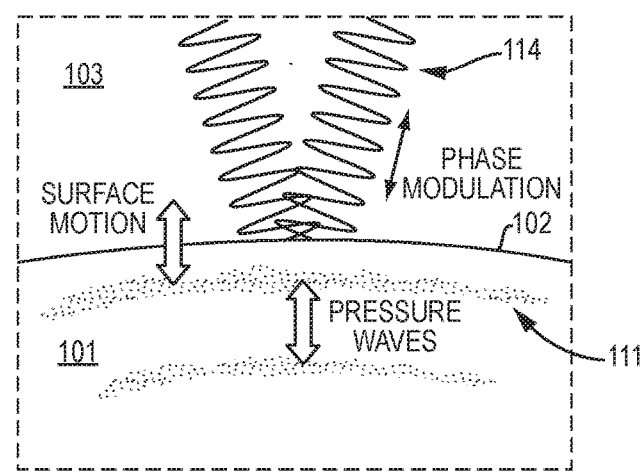
FIG. 2B shows underwater sound waves creating vibrations of the water's surface, which in turn modulate the phase of radar signals that reflect from the surface.

FIG. 2B shows underwater sound waves creating vibrations of the water's surface 102, which in turn modulate the phase of radar signals 114 that reflect from the surface.

The radar transceiver 112 may detect the modulations of phase of the reflected radar signals. A computer may determine, based on these modulations of phase, the displacements of the water-air surface that are caused by the sound waves. The underwater loudspeaker may encode the sound signal by OFDM (orthogonal frequency-division multiplexing). This in turn may cause the vibrations of the water-air surface, and the modulations of phase of the reflected radar signal, to be OFDM modulated. A computer may decode the OFDM modulations of phase of the reflected radar signal, to determine the contents of the communication that was initially encoded by the sound signal.

In some implementations of this invention, an end-to-end communication channel includes three components: underwater propagation, the water-air interface, and in-air propagation.

Water-Air Surface

First, we analyze the water-air interface. In some implementations, an underwater transmitter sends packets using acoustic signals. These signals may travel in the water as pressure waves P(r,t), which vary in time t and range r, and can be expressed as:

$$P(\omega,t)=A(\omega)e^{j\omega(t-r/v_w)} \quad \text{(Equation 1)}$$

where A is the amplitude, $\omega$ is the angular frequency, $v_w$ is the velocity in water, t is time, j is an imaginary number equal to the square root of negative one, and e is Euler's number.

Note that the amplitude A is also a function of distance r, but we omit it for simplicity in this discussion.

Acoustic pressure waves are longitudinal waves. As a longitudinal wave propagates in a medium, it displaces the medium's particles in the direction of the wave's propagation and then in a direction opposite to the direction of propagation. Hence, when a pressure wave hits the surface of water, it causes a surface displacement $\delta$. If the incident wave is orthogonal to the surface, then the displacement $\delta$ may be modeled as:

$$\delta(\omega,t) = \frac{P(\omega,t)}{\rho_w \omega v_w} \quad \text{(Equation 2)}$$

where P is the overall pressure created by the acoustic wave and $\rho_w$ is the density of water.

The displacement (of the water's surface) caused by the underwater pressure wave is minute. For instance, in a test of a prototype of this invention, peak-to-peak displacement of the water's surface (due to the acoustic signal transmitted by the acoustic transducer) was more than 2 microns and less than 40 microns, even though the underwater transmitter was only submerged half a meter below the water's surface.

The water-air interface may comprise a linear channel. In particular, the frequency of the surface displacement matches the frequency of the acoustic signals transmitted by the underwater speaker. Such behavior is consistent with Equation 2, which shows that the displacement is directly proportional to the pressure wave. This means that the water-air interface may act as a linear and time-invariant channel. Because the water-air interface functions as a linear and time-invariant channel, it is well suited to transmit a modulated signal. For instance, in some implementations: (a) a modulation method—such as AM (amplitude modulation), FM (frequency modulation), BPSK (binary phase-shift keying), or OFDM (orthogonal frequency division multiplexing)—is employed to modulate the acoustic signals and thus indirectly modulate the displacements of the water-air surface that are detected by radar. In some implementations, a communication channel is estimated with preamble symbols and inverted for reconstruction and decoding.

In some implementations, the amplitude of the displacement (of the water-air surface) is inversely proportional to the frequency of the transmitted acoustic signal. This has at least two consequences. First, lower frequencies may be more desirable because they cause a larger displacement of water-air surface, and hence a larger signal-to-noise ratio (SNR). Second, signals at different frequencies may experience very different attenuation. In some implementations of this invention, the communication protocol may account for the frequency-selective attenuation.

As discussed above, in some implementations of this invention, acoustic waves propagate through water and radar signals propagate through air. The following three paragraphs explain why it would typically be impossible to rely on acoustic signals alone in both water and air.

Since the acoustic wave hits the surface and causes a displacement, the displacement itself can generate a pressure wave that travels in air. Hence, we ask whether it would be more efficient to directly leverage the generated pressure wave in the air for communication. There are multiple reasons why such an approach (using only acoustic signals in both water and air) is undesirable. First, while part of the pressure wave indeed crosses the boundary and travels in air, the majority of the incident pressure wave reflects off the water-air interface. In particular, by solving the sound wave equation for a wave incident at a boundary between two different media, we obtain the following relationship between the amplitude of the reflected wave $A_r$ and the amplitude of the incident one $A_i$:

$$A_r = \frac{v_a \rho_a - v_w \rho_w}{v_a \rho_a + v_w \rho_w} A_i \qquad \text{(Equation 3)}$$

where $v_a$ and $v_w$ are the speeds of sound in air and water respectively and $\rho_a$ and $\rho_w$ are the air and water densities respectively.

Due to the large difference between the constants for air and water, the reflected amplitude is almost equal to the incident one (i.e., $A_r \approx A_i$). And, by the law of conservation of energy, the amplitude of the transmitted signal $A_t = \sqrt{A_i^2 - A_r^2}$. Using standard values for velocity and density, we can show that pressure waves crossing into air attenuate by around 30 dB solely because of reflection at the boundary.

Second, aside from the attenuation at the boundary, acoustic waves experience exponential attenuation when traveling in air. This makes them an unsuitable means for wireless communication over the air. Indeed, this is why wireless communication systems such as WiFi® and cellular employ RF signals instead of sound signals.

As noted above, in some implementations of this invention, the water-air surface facilitates uplink communication (from an underwater node to an airborne node). The following two paragraphs explain why it would typically be impossible to employ the water-air surface for downlink communication (from the airborne node to the underwater node).

A natural question is: why can't we use the same technique to enable an in-air node to communicate with an underwater hydrophone. In principle, an acoustic signal transmitted from an airborne speaker should also cause a vibration of the water-air interface that can be picked up by an underwater hydrophone.

The answer lies in the nature of interference between the incident and reflected pressure waves at the water-air boundary. Specifically, these waves constructively interfere when they hit the boundary of a less dense medium (i.e., when traveling from water to air), but destructively interfere when they hit the boundary of a more dense medium (i.e., when traveling from air to water). Since the displacement is directly proportional to the overall pressure as per Equation 2, the displacement is maximized for underwater pressure waves, but it is nulled for acoustic signals arriving from the air. Hence, while this mechanism enables underwater-to-air communication, it does not enable an air-to-underwater communication link.

End-to-End Channel

Now that we understand the water-air interface, we would like to quantify the impact of each of the channel components on the overall signal attenuation.

Underwater Attenuation: The attenuation of a sound wave traveling from an underwater speaker to the water's surface may be equal to $e^{-\gamma r}/r$ where r is depth of the speaker below the surface, $\gamma$ quantifies the absorption, and e is Euler's number. Thus, the amplitude of the sound wave may decay exponentially as it travels through water.

Attenuation at Water-Air Surface: The attenuation at the water-air interface is given by Equation 2 in terms of pressure. Assuming that the received power is proportional to $\delta(\omega,t)^2$, and knowing that the transmitted power is proportional to $P(\omega,t)^2$ and inversely proportional to $\rho_w$ and $v_w$, we can express the sensed power at the water-air interface as:

$$P_{sensed} \propto \frac{P_{incident}}{\rho_w v_w \omega^2} \qquad \text{(Equation 4)}$$

Attenuation of Radar in Air: Signal amplitude of a standard radar signal attenuates as $1/d_0^2$, where $d_0$ is the distance between the transmitter and the receiver. However, because water is specular at the wavelengths of RF signals (i.e., water reflects back almost all the impinging RF signals), we may approximate the overall signal attenuation as $1/(2d_0)$.

Thus, the overall pathloss (PL) (of the end-to-end channel from the underwater acoustic transducer to the airborne radar) in dB is linear in depth r and logarithmic in height $d_0$, water density $\rho_w$, frequency $\omega$, and velocity $v_w$. Recall that depth r is depth of the underwater transducer below the water-air surface, height $d_0$ is height of the radar transceiver above the water-air surface, and velocity $v_w$ is the speed of sound in water.

In many use scenarios, water density $\rho_w$ and speed of sound in water $v_w$ are known. This is because these parameters ($\rho_w$ and $v_w$) depend on the water salinity and temperature. An underwater sensor may directly estimate or infer both water salinity and temperature.

Thus, in many use scenarios: (a) $\rho_w$ and $v_w$ are known (e.g., because water salinity and temperature are measured or inferred); and (b) estimating the overall attenuation requires estimating only r and $d_0$. Further, since the path loss may increase linearly in depth r but logarithmically in height $d_0$, the dominant unknown path loss component may be depth r.

Acoustic Transmitter

In some implementations of this invention, an acoustic transducer encodes and modulates its transmissions.

Recall that, in some implementations of this invention, a communication channel: (a) may be amenable to various modulation schemes since it is linear and time-invariant; and (b) may be highly frequency selective.

To deal with frequency-selective fading, the acoustic transmitter may employ Orthogonal Frequency Division Multiplexing (OFDM) to encode the underwater acoustic signal.

Instead of encoding the transmitted bits directly in the time domain, an OFDM transmitter may encode symbols in the frequency domain. In OFDM, each frequency may be a subcarrier. An OFDM transmitter may treat each frequency as an independent channel and transmit signals on all of them concurrently. The OFDM encoding scheme is attractive because decoding may be done in the frequency domain without the need for complex channel equalizers.

In some implementations of this invention, an acoustic transmitter divides its power across the different subcarriers. In some implementations of this invention, a communication channel may have high SNR at lower frequencies and lower SNR at higher frequencies. Thus, distributing power evenly across the different subcarriers may result in sub-optimal performance. Conversely, a power allocation strategy that concentrates all the available power into the lowest-frequency subcarrier may maximize the SNR, but also result in sub-optimal performance since it forgoes much of the available bandwidth.

In some implementations, power allocation among the subcarriers is optimized. To determine the optimal power allocation among frequency subcarriers, a so-called waterfilling method may be employed.

Figure 3:
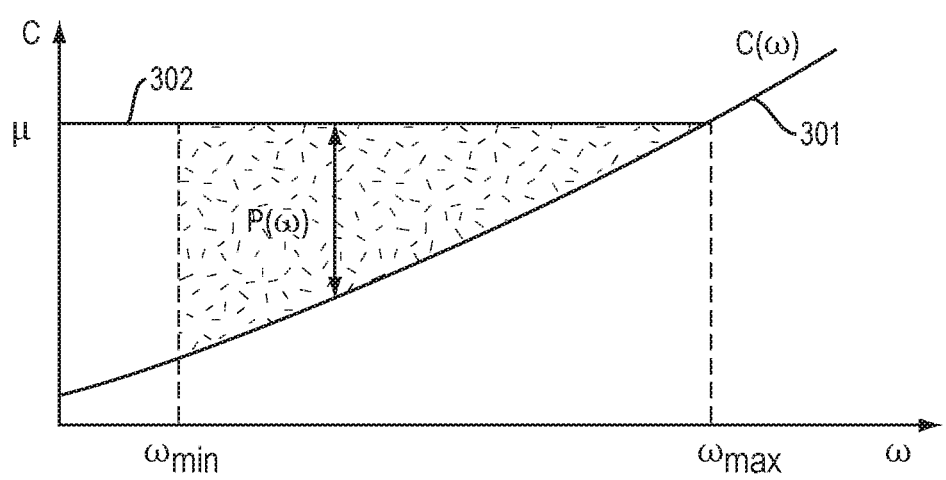
FIG. 3 is a chart that conceptually illustrates an algorithm to determine optimal power allocation among frequency subcarriers.

FIG. 3 is a chart that conceptually illustrates waterfilling, in some implementations of this invention. In FIG. 3, noise $C(\omega)$ 301 increases with frequency $\omega$. The level $\mu$ 302 determines the optimal power allocation. $P(\omega)$ is optimal power as a function of frequency.

FIG. 3 plots noise power $C(\omega)$ as a function of frequency $\omega$. As per Equation 4, we can express $C(\omega) = \rho_w v_w \omega^2/a$, where a is a real positive constant which depends on the transmitted signal power, the distance attenuation, and the receiver noise floor. Basically, in the waterfilling, we may solve for a level $\mu$. Specifically, the optimal power allocation is the difference between $\mu$ and the noise power $C(\omega)$. We can express the optimal power allocation (i.e., optimal power as a function of frequency) as:

$$P(\omega) = \begin{cases} \mu - C(\omega), & \text{if } \mu - C(\omega) \geq 0 \\ 0, & \text{otherwise} \end{cases} \quad \text{(Equation 5)}$$

where $\omega$ is frequency; and $P(\omega)$ is optimal power as a function of frequency $\omega$.

To solve for $\mu$, we may use the total power constraint, which states that the total power across all the subcarriers (i.e., the integral of the power densities) must equal the total power of the transmitter $\rho_0$. That is:

$$\int_{\omega_{min}}^{\infty} P(\omega) d\omega = P_0 \quad \text{(Equation 6)}$$

where $\omega_{min}$ is the lowest frequency at which the underwater speaker or acoustic transducer can operate.

For some communication channels in some implementations of this invention, the function $P(\omega)$ is continuously decreasing, meaning that the integral in Equation 6 may be computed without non-linearity over the interval in which it is positive. Such interval spans from $\omega_{min}$ to the frequency at which the power density $P(\omega)$ is equal to zero, $\omega_{max}$ as shown in FIG. 3. Setting Equation 5 to zero and solving for $\omega$ we get $$\omega_{max} = \sqrt{\frac{a\mu}{\rho_w v_w}}.$$

Using this maximum frequency and the total power constraint of Equation 6, we obtain the following third degree polynomial in $\sqrt{\mu}$:

$$\frac{2}{3}\sqrt{\frac{a}{\rho_w v_w}} \mu^{\frac{3}{2}} - \omega_{min}\mu + \frac{\rho_w v_w \omega_{min}^3}{3a} - P_0 = 0 \quad \text{(Equation 7)}$$

The real positive root of this polynomial gives the level $\mu$ which allows us to obtain an analytical form for the optimal power distribution with respect to the noise frequency profile discussed above. The acoustic transmitter may use this information to assign power to its subcarriers according to this computed distribution at the center frequency of each subcarrier.

In OFDM-based systems, each subcarrier may comprise a separate flow with its own modulation—such as BPSK or QPSK (quadrature phase-shift keying). The acoustic transmitter may determine the optimal power allocation, and proceed to bitrate selection on a per-subcarrier basis.

The acoustic transmitter may include one or more computers. Likewise, the radar transceiver (or other device that detects surface vibrations caused by the acoustic signal) may include one or more computers.

In some cases, the acoustic transmitter knows or estimates the power allocation $P(\omega)$ and the noise function $C(\omega)$, as described in more detail below. Based on this knowledge or these estimates (of power allocation $P(\omega)$ and noise function $C(\omega)$), the acoustic transmitter may estimate the expected SNR at the radar transceiver and may calculate an appropriate bitrate based on the estimate SNR. For instance, the acoustic transmitter may employ higher modulations (e.g., 64QAM) at lower-frequency subcarriers (which have higher SNRs) and lower modulation schemes (e.g., BPSK) at higher-frequency subcarriers (which have lower SNRs).

The exact SNR at which the acoustic transmitter switches between the different modulation schemes may be determined both analytically and empirically.

In some implementations of this invention, rate adaptation is performed by only changing the modulation scheme. Alternatively or in addition, the coding rate (e.g., 1/2-rate or 3/4-rate coding) may be adapted.

In some implementations: (a) information that specifies the modulation scheme employed by every subcarrier is embedded in a packet header which is sent via BPSK modulation; and (b) this information (regarding the modulation schemes for the respective subcarriers) enables the transmitted packets to be decoded.

In illustrative implementations, the acoustic transmitter does not have direct access to channel information. This is because system only performs one-way communication; hence, the radar transceiver (or other device that detects the surface vibrations) is unable to send the channel estimates as feedback to the acoustic transmitter.

To overcome this challenge, the acoustic transmitter may leverage known properties of the channel and combine them with side-channel information. For instance, in some cases, the only unknown variables that affect the attenuation are height (of the radar above the water's surface) $d_0$ and depth (of the acoustic transmitter below the water's surface) r. In some cases, the acoustic transmitter accurately estimates height $d_0$ and depth r, and based on these estimates, accurately estimates the overall SNR.

To estimate the depth underwater r, the acoustic transmitter may employ a pressure sensor. For instance, underwater pressure may be directly mapped to depth (through $P=\rho_w gr$, where $\rho_w$ is the density of water and g is the gravitational field strength). In some implementations, the acoustic transmitter includes (or is located in the same housing as) a pressure sensor that has millimeter-level precision in measuring underwater depth.

In some use scenarios, the acoustic transmitter has prior knowledge of the height of the radar transceiver above the water. For example, an underwater submarine trying to communicate with an airplane may have reasonable estimates on the altitude at which airplanes fly based on standard flight patterns. Alternatively, an aircraft that houses a radar transceiver may decrease its altitude to improve SNR of a communication.

FIG. 4A shows an algorithm for transmission, in an illustrative implementation of this invention. As shown in FIG. 4A, CRC (cyclic redundancy check) values may be added to blocks of data before transmitting the acoustic signal.

In the algorithm shown in FIG. 4A, the modulation methods for different subcarrier frequencies, respectively, are selected by comparing signal-to-noise ratios (SNRs). Specifically, in this algorithm, SNR($\omega$)—which is the signal-to-noise ratio at subcarrier frequency $\omega$—is compared to one or more of the following SNR values: $SNR_1$, $SNR_2$ and $SNR_3$. In this algorithm: (a) if SNR($\omega$)≤$SNR_1$, then BPSK (binary phase-shift keying) modulation is employed; (b) if $SNR_1$<SNR ($\omega$)≤$SNR_2$, then QPSK (quadrature phase-shift keying) modulation is employed; (c) if $SNR_2$< SNR($\omega$)≤$SNR_3$, then 16QAM modulation is employed; and (d) if $SNR_3$<SNR($\omega$), then 64QAM modulation is employed. In this algorithm: (a) $SNR_1$ occurs at the intersection of the throughput-SNR curves for BPSK modulation and QPSK modulation, respectively; (b) $SNR_2$ occurs at the intersection of the throughput-SNR curves for QPSK modulation and 16QAM modulation, respectively; and (c) $SNR_3$ occurs at the intersection of the throughput-SNR curves for 16QAM modulation and 64QAM modulation, respectively. The throughput may be measured as bits per second. Both the throughput and SNR may be calculated for the entire, end-to-end communication channel (e.g., from a submerged acoustic transmitter to an airborne radar).

FIG. 4B is a chart that illustrates throughput-SNR curves. These throughput-SNR curves may be used to select SNR values (e.g., $SNR_1$, $SNR_2$ and $SNR_3$) that may in turn be used to select which modulation method to use for a particular subcarrier frequency. In the example shown in FIG. 4B, the throughput-SNR curve for BPSK modulation 403 intersects the throughput-SNR curve for QPSK modulation 402 at intersection point 421. Likewise, the throughput-SNR curve for QPSK modulation 402 intersects the throughput-SNR curve for 16QAM modulation 401 at intersection point 422. In the example shown in FIG. 4B, the SNRs at intersection points 401 and 402 respectively would be $SNR_1$ and $SNR_2$ respectively in the algorithm discussed above.

The throughput-SNR curves in FIG. 4B are non-limiting examples. In practice, throughput-SNR curves (and thus $SNR_1$, $SNR_2$ and $SNR_3$) vary depending on environmental factors (e.g., pressure, density, temperature and salinity of the water). The values $SNR_1$, $SNR_2$ and $SNR_3$ in the algorithm shown in FIG. 4A may be dynamically adjusted, based on estimates of frequency channels, or based on measurements of one or more environmental conditions (e.g., pressure, density, temperature or salinity of water).

As is well known, BPSK, QPSK, 16QAM and 64QAM are formats that may be employed in OFDM modulation.

Receiver

We sometimes refer loosely to a device that detects the displacements of the water-air surface as a "receiver". However, in some implementations, a device that detects the displacements of the water-surface may actually comprise: (a) a transceiver that both sends wireless signals to the water-air surface and measures reflections from that surface; and (b) one or more computers that analyze and decode the measurements of the reflections. (Likewise, a transmitter may include one or more computers that control the transmitter).

In some cases, a radar transceiver both (a) transmits radar signals and (b) measures phase-modulated radar signals that reflect from the water-air surface.

In some cases, a transceiver or receiver: (a) measures minute surface displacements caused by the acoustic pressure wave signal; (b) cancels interference caused by the ocean waves; and (c) decodes the filtered reflection.

In some cases, a radar transceiver measures the minute surface displacements by estimating the phase of the reflected radar signal. In particular, the phase of the reflected radar signal $\phi(t)$ may be expressed as:

$$\phi(t) = 4\pi \frac{d_0 + \delta(t)}{\lambda} \qquad \text{(Equation 8)}$$

where $d_0$ is the distance between the radar and the water surface (in the absence of vibrations), $\lambda$ is the wavelength of the radar's transmitted signal, and $\pi$ is Archimedes' constant.

Equation 8 has at least two interesting implications:

First, the wavelength $\lambda$ may strongly impact the ability to accurately track the surface displacement. On one hand, a relatively large wavelength (e.g., few centimeters) would result in very minute variations in the phase, making it less robust to noise. On the other hand, employing a very small wavelength (e.g., sub-µm as in THz) may result in rapid phase wrapping.

Second, the choice of wavelength $\lambda$ also impacts the system's ability to adapt to ocean waves in the environment. For instance, a very small wavelength will suffer from rapid phase rotation even in the presence of very small waves.

In some cases, a millimeter-wave FMCW radar transceiver detects the vibrations of the water-air surface that are caused by the acoustic signal.

In some implementations of this invention, an FMCW wideband radar detects the surface vibrations. This wideband radar may achieve high phase resolution while mitigating interference from other reflectors in the environment. The wideband radar may filter reflections coming from different distances into different bins. This enables the wideband radar: (a) to isolate the reflection off the water's surface from other reflections in the environment; and (b) measure the phase of the reflection off the water's surface; and (c) employ the measured phase to decode the surface vibrations. In some cases, a receiver (e.g., a radar transceiver) performs surface reflection identification, phase extraction, and decoding.

In some cases, the radar is placed above the water's surface and detects vibrations of the surface that are caused by sound waves from an underwater speaker. The radar may transmit a signal and measures its reflections. The radar may process these reflections to obtain the power of the reflections as a function of distance.

In some cases, one or computers (e.g., that are part of a radar transceiver): (a) filter reflections coming from different distances into different range bins; (b) determine which range bin has the greatest signal power (and thus has reflections from the water-air surface); (c) determine raw phase of the signal in that range bin; (d) unwrap phase of the signal in that range bin; and (e) band-pass (or high-pass) filter the unwrapped signal, thereby filtering out low frequencies caused by displacements due to surface wind waves.

For instance, reflections may be separated into different range bins and then further processed to unwrap phase, as follows:

An FMCW radar may transmit an FMCW radar signal and measure the signal's reflection from the water's surface. One or more computers may: (a) in the time domain, multiply the measured reflection and the transmitted signal; and (b) perform a Fourier transform (e.g., a Fast Fourier Transform) on the product. The output of the Fourier transform is a complex series (amplitude and phase) as a function of frequency. Each frequency bin in the Fourier transform corresponds to a "range" bin. One or more computers may identify the bin with the highest amplitude as the one corresponding to the water surface reflection. The one or more computers may obtain the phase value in that bin. The process described in the preceding sentences of this paragraph may be repeated for each FMCW signal, as the radar repeatedly sends FMCW signals over time. In each repetition, the phase value in the selected range bin may be calculated, as described above. Then, one or more computers may unwrap the resulting time-series of phase values, to obtain unwrapped phase.

Figure 5:
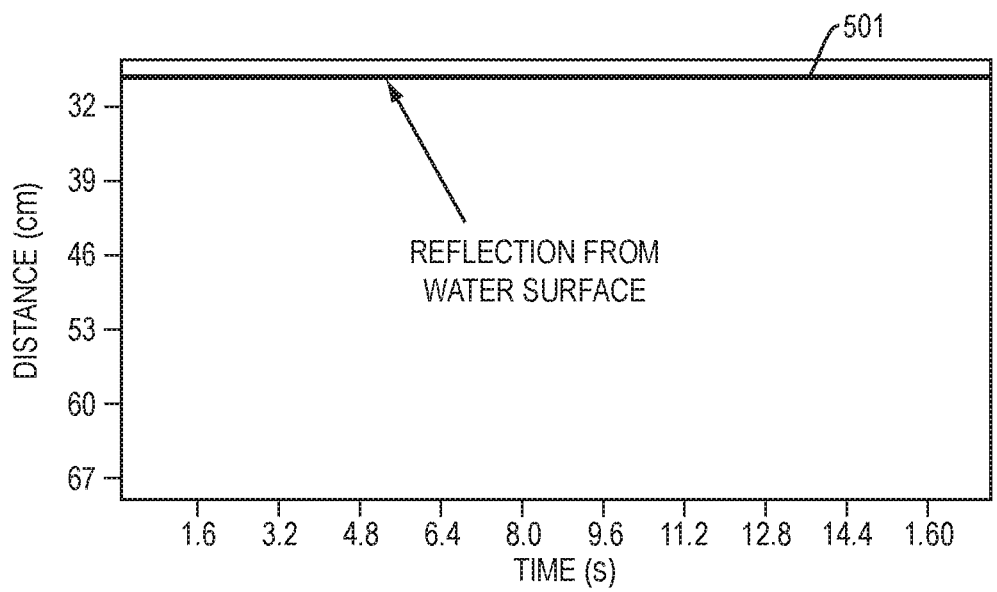
FIG. 5 is a chart that plots reflection from the water's surface.

FIG. 5 is a chart that plots reflection from the water's surface. In the example shown in FIG. 5, the x-axis shows time, while the y-axis indicates distance. A horizontal line indicates a reflection arriving from a particular location. Horizontal line 501 indicates reflection from the water-air surface. One or computers (e.g., that are part of a radar transceiver) may identify the range bin corresponding to the water surface, based on the fact that the water surface has the largest radar cross section, and hence the highest reflection power.

After identifying the range bin that includes reflections from the water-air surface, the system may determine the raw phase of the signal in that range bin, and then unwrap raw phase. This unwrapping may be performed to avoid ambiguities in measurement that would otherwise arise due to phase wrapping. The surface waves (and resulting phase wrapping) would—unless phase unwrapping were performed—obscure the μm-scale vibrations of the surface caused by the acoustic transmitter. Any conventional method may be employed to unwrap the phase.

Figure 6A:
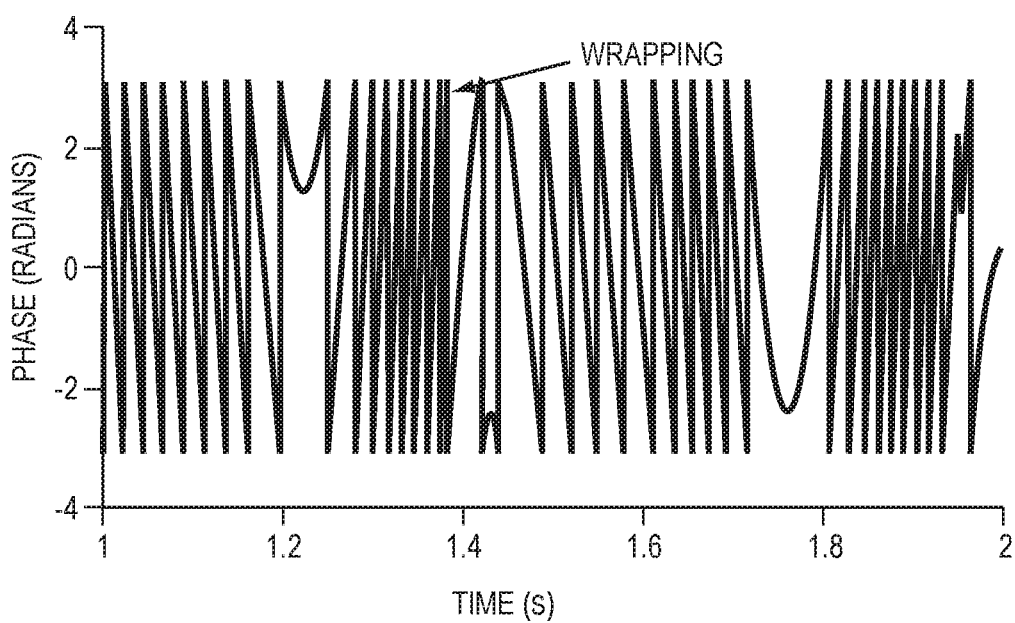
FIG. 6A is a chart that shows raw recorded phase from a distance bin of interest.
Figure 6B:
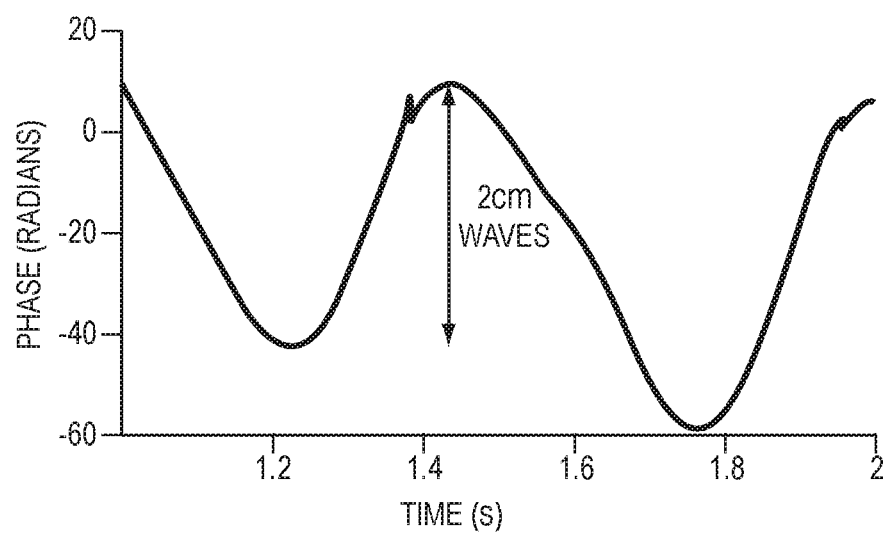
FIG. 6B is a chart that shows un-wrapped phase.

FIG. 6A is a chart that shows raw recorded phase from a distance bin of interest. FIG. 6B is a chart that shows un-wrapped phase.

In an illustrative use scenario: (a) a millimeter wave radar (which detects the surface vibrations) emits a radar signal that has a wavelength of 5 mm; (b) the phase of the reflected radar signal wraps around every 0.2 seconds; (c) surface displacements larger than 5 mm (which may arise due to wind waves at the surface of the water) cause phase wrapping; and (d) the unwrapped signal (which results for phase unwrapping) has a peak-to-peak variation of 50 radians (which, at a wavelength of 5 mm, corresponds to a 2 cm peak-to-peak displacement).

To eliminate the impact of surface wind waves, one or more computers (e.g., in a radar transceiver) may apply a bandpass (or high pass) filter to the unwrapped phase. This may filter out lower frequencies due to the surface wind waves (which typically have a frequency that is between 0.1 Hz and 3 Hz), while letting higher frequencies due to surface vibrations (which are caused by the acoustic signal) pass. The acoustic signal (and the surface displacements created by the acoustic signal) may have a frequency that is greater than or equal to 100 Hz and less than or equal to 200 Hz.

In some implementations of this invention, millimeter-wave radar frequencies enable a radar transceiver to overcome (unwrap and filter) the impact of ocean waves while at the same time sensing surface displacements (of the order of few μm) due to underwater acoustic pressure waves.

In some implementations, an acoustic transmitter sends OFDM symbols over its bandwidth of operation. To decode these symbols, a receiver (a radar transceiver) may perform standard OFDM packet detection, extract the channel and the modulations from the header, and use them to decode the packet payload.

Prototype

The following nine paragraphs describe a prototype of this invention.

In this prototype, an underwater acoustic speaker generates an acoustic signal and an airborne millimeter wave FMCW radar functions detects vibrations of the water-air surface that are caused by the acoustic signal.

In this prototype, the underwater acoustic speaker is an Electro-Voice® UW30 Underwater Loudspeaker. The speaker is connected to the output audio jack of a Lenovo® Thinkstation® PC through a power amplifier. In our evaluation, we used two types of amplifiers: the OSD™ 75 W Compact Subwoofer Amplifier and the Pyle™ 300 W Stereo Receiver. The speaker transmits signals over a bandwidth of 100 Hz between 100 Hz and 200 Hz.

In this prototype, the acoustic speaker (transmitter) encodes its data using OFDM modulation. Each OFDM symbol consists of 64 subcarriers which cover the available bandwidth. The transmitter performs per-subcarrier power allocation and bitrate adaptation. Each OFDM symbol is pre-pended with a cyclic prefix.

In this prototype, in some use scenarios, the acoustic transmitter transmits 10 back-to-back OFDM symbols (two symbols act as a preamble and 8 as payload). The acoustic transmitter includes the modulation scheme for every subcarrier in its header, and a CRC for every subcarrier to determine whether the packet was received correctly.

In this prototype, a millimeter-wave FMCW radar detects the surface vibrations. To generate the desired millimeter-wave signals, the radar first generates a reference FMCW signal. The reference outputs a frequency ramp with a center frequency of 8.65 GHz and a bandwidth of 500 MHz. The output of this FMCW signal generator is fed into a 2× frequency multiplier, whose output is in turn fed as a local oscillator to a millimeter wave transmitter and receiver. This architecture enables transmitting and receiving an FMCW signal with a center frequency of 60 GHz and a bandwidth of 3 GHz. This results in an effective range resolution of 5 cm, and a phase sensitivity of 1.25 rad/mm. The millimeter wave transmit and receive boards are connected to 23 dBi horn antenna.

In this prototype, the FMCW generator is programmed to sweep its bandwidth every 80 μs. The receiver captures and downconverts the reflected signals to baseband and feeds them into a USRP® N210 software radio equipped with an LFRX daughterboard. The USRP® digitizes the signals and sends them over an Ethernet cable to a 64-bit machine running Ubuntu® 16.04 for post-processing.

In this prototype, the decoder is programmed in MATLAB™. The decoder identifies the range bin corresponding to the water surface, then extracts the phase of the reflection and performs unwrapping and filtering. To decode the filtered phase signal, it performs packet detection, channel estimation, and OFDM decoding.

This prototype can sustain a communication link in the presence of surface waves with peak-to-peak amplitudes up to 16 cm. In this prototype, the communication channel maintained minimal degradation up to 6 cm waves, which are 100,000× larger than the surface vibrations caused by the underwater acoustic transmitter. The prototype's ability to deal with this large interference arises from its unwrapping and filtering stages, which significantly mitigate the slower moving waves.

In a test, this prototype achieved throughputs of 100 bps, 200 bps and 400 bps for BPSK, QPSK and 16QAM modulation, respectively.

The prototype described in the preceding nine paragraphs is a non-limiting example of this invention. This invention may be implemented in many other ways.

More Details

This invention is not limited to using radar to detect vibrations of a surface. Alternatively, a camera or light sensor may detect variations in electromagnetic (EM) radiation that reflects from the vibrating surface. The reflected radiation may comprise reflected ambient light. Or, for instance, an active source of EM radiation may illuminate the vibrating surface. A sensor (such as a camera, interferometer or other light sensor) may detect EM radiation that reflects back from the vibrating surface. In some cases, the electromagnetic radiation comprises visible light, infrared light, or ultraviolet light. The visible, infrared or ultraviolet light may be collimated. The active source of EM radiation may comprise a laser or LED (light-emitting diode) or may comprise lasers or LEDs that emit different frequencies, respectively, of light. The vibrating surface may be vibrating due, at least in part, to acoustic pressure waves transmitted by the acoustic transmitter.

This invention is not limited to transmitting acoustic signals through water. Alternatively, the acoustic signals may be transmitted through any media. For instance: (a) the acoustic signals may be transmitted through bodily tissue, causing vibrations of the body's skin; and (b) the radar (or EM radiation) may be transmitted through air to detect the vibrations of the skin. Also, for instance, the acoustic signal may be transmitted through oil or other liquid (e.g., a hydraulic fracturing mixture) in an oil well or gas well, to enable wireless communication from sensors deep underground in the well. In some cases, the acoustic signal is transmitted through a medium that is denser than the media through which the radar (or EM radiation) propagates.

This invention is not limited to EM radiation (e.g., radar signals) propagating through air. Alternatively, the EM radiation (e.g., radar signals) may propagate through a vacuum or through a gas that is not air.

In some cases, the device (e.g., radar transceiver) that detects the surface vibrations is airborne (e.g., housed in an airplane, drone or other aircraft that flies). However, this invention is not limited to airborne detectors. Alternatively, the weight of the device that detects the surface vibration may be directly or indirectly supported by the solid surface of the Earth.

This invention is not limited to detecting vibrations of a surface that is an interface between a liquid and a gas (e.g., a water-air surface such as the ocean's surface). Alternatively, the vibrating surface may be a solid. For instance, the vibrating surface may be a surface of a solid object that is vibrating due (at least in part) to acoustic pressure waves that are generated by an acoustic transducer, then propagate through a liquid, and then propagate through the solid object. For instance, the vibrating surface may comprise skin or may comprise a thin vibrating solid film.

This invention is not limited to OFDM modulation. Alternatively, any other modulation method may be employed, including any method of frequency modulation or amplitude modulation.

Figure 7:
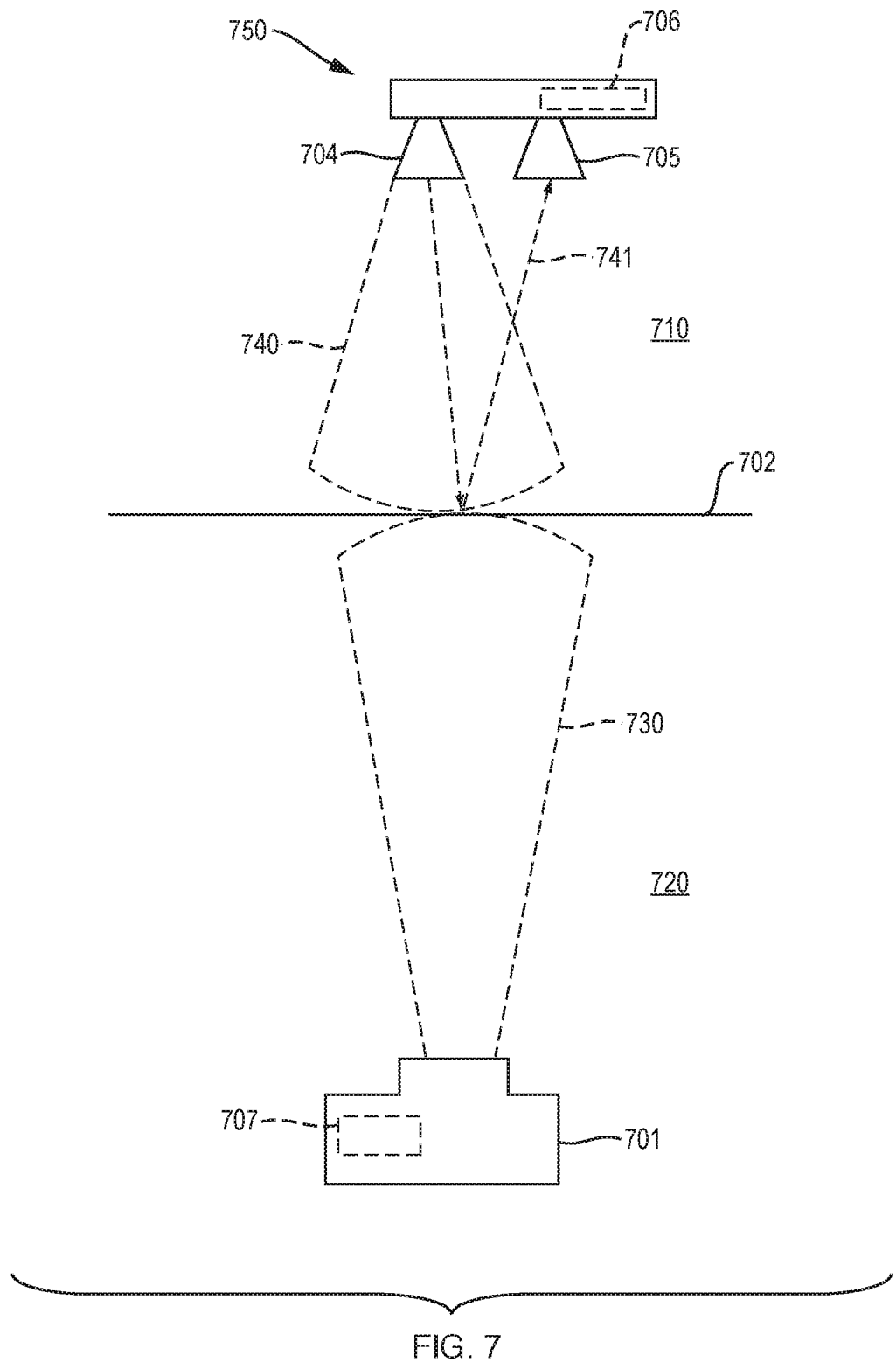
FIG. 7 shows hardware of a communication system.

FIG. 7 shows hardware of a communication system, in an illustrative implementation of this invention. In the example shown in FIG. 7, an acoustic transducer (e.g., a speaker) 701 creates acoustic pressure waves 730 that comprise an acoustic signal. The acoustic signal may be encoded by frequency modulation (e.g., OFDM) or amplitude modulation. The acoustic pressure waves 730 may travel to, and cause vibrations of, a surface 702 that is an interface between a first media 720 and a second media 710. For instance: (a) the second media 710 may be air; and (b) the first media 720 may be water, bodily tissue, oil, or a fracking mixture. The first media 720 may be more dense than the second media 710. A device 750 that detects the surface vibrations may transmit electromagnetic radiation 740 (e.g., radar signals or light) that propagates through the second media 710. The electromagnetic radiation 740 may travel to and reflect from the vibrating surface 702 and then travel back to the device 750 (e.g., along path 741). Device 750 may include: (a) hardware 704 configured to emit EM radiation and (b) hardware 705 configured to measure reflected EM radiation. For instance, hardware 704 may comprise a radar transmitter for transmitting radar signals and hardware 705 may comprise a radar receiver for measuring reflected radar signals. Or, for instance, hardware 704 may comprise a light source for emitting visible, infrared or ultraviolet light and hardware 705 may comprise a light sensor, camera or interferometer for measuring the light after it reflects from the vibrating surface. One or more computers may control the communication system. For instance, computers 707 and 706 may control the acoustic transmitter 701 and device 750, respectively.

In some implementations: (a) both the acoustic transmitter and the device that detects the surface vibrations actively track surface waves; and (b) based on measurements taken during the tracking, the communication protocol is dynamically adjusted. In some cases, this facilitates robust communication even in the presence of strong surface waves (e.g., greater than 16 cm peak-to-peak amplitude) and inclement weather conditions.

For example, an underwater transmitter may directly track the surface to estimate the underwater channel. Since part of the acoustic signal transmitted from underwater reflects off the water-air surface and comes back to the transmitter, the acoustic transmitter may use the reflected signal to estimate the channel to the surface. The acoustic transmitter may then use this estimated channel to estimate underwater attenuation and adapt transmission rate and power allocation (e.g., among frequency subcarriers) accordingly. The transmitted signal may be modulated in any manner, e.g., OFDM.

In some implementations, communication degrades if the acoustic transmitter and radar transceiver (or other device that detects the surface vibration) are not aligned along roughly the same vertical axis. To mitigate or avoid this degradation (where there is not rough vertical alignment), an airborne radar transceiver (or other device that detects the surface vibration) may finely scan the water surface in order to localize the underwater transmitter. Alternatively, this degradation may be mitigated or avoided by dynamically adjusting the beam profiles of both the acoustic and radar devices, based on height (of the radar transceiver above water), depth (of the acoustic transmitter below the water), and expected SNR (signal to noise ratio).

Computers

In illustrative implementations of this invention, one or more computers (e.g., servers, network hosts, client computers, integrated circuits, microcontrollers, controllers, field-programmable-gate arrays, personal computers, digital computers, driver circuits, or analog computers) are programmed or specially adapted to perform one or more of the following tasks: (1) to control the operation of, or interface with, hardware components of a transmitter and a receiver, such as a loudspeaker or radar transceiver; (2) to control the operation of, or interface with, any active source of electromagnetic radiation, including any laser, LED or radar transmitter; (3) to perform frequency modulation (e.g., OFDM encoding and decoding); (4) to optimize power allocation among transmitted frequency channels; (5) to estimate a communication channel (e.g., to estimate attenuation, path-loss or SNR of a communication channel) and, based on the estimate, to adaptively vary modulation method, bitrate or coding rate of a transmitted channel such as an OFDM subcarrier; (6) to receive data from, control, or interface with one or more sensors, including any pressure sensor, camera, interferometer, light sensor or radar receiver; (7) to perform any other calculation, computation, program, algorithm, or computer function described or implied herein; (8) to receive signals indicative of human input; (9) to output signals for controlling transducers for outputting information in human perceivable format; (10) to process data, to perform computations, and to execute any algorithm or software; and (11) to control the read or write of data to and from memory devices (tasks 1-11 of this sentence referred to herein as the "Computer Tasks"). The one or more computers (e.g. 706, 707) may, in some cases, communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied herein. For example, in some cases, instructions encoded in a tangible, non-transitory, computer-accessible medium comprise instructions for a computer to perform the Computer Tasks.

Computer Readable Media

In some implementations, this invention comprises one or more computers that are programmed to perform one or more of the Computer Tasks.

In some implementations, this invention comprises one or more machine readable media, with instructions encoded thereon for one or more computers to perform one or more of the Computer Tasks.

In some implementations, this invention comprises participating in a download of software, where the software comprises instructions for one or more computers to perform one or more of the Computer Tasks. For instance, the participating may comprise (a) a computer providing the software during the download, or (b) a computer receiving the software during the download.

Network Communication

In illustrative implementations of this invention, electronic devices (e.g., 112, 706, 750) are each configured for wireless or wired communication with other devices in a network.

For example, in some cases, one or more of these electronic devices each include a wireless module for wireless communication with other devices in a network. Each wireless module may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables or wiring.

In some cases, one or more computers (e.g. 706) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), or wireless communication standard, including IEEE 802.11 (Wi-Fi®), IEEE 802.15 (Bluetooth®/Zigbee®), IEEE 802.16, IEEE 802.20, GSM (global system for mobile communications), UMTS (universal mobile telecommunication system), CDMA (code division multiple access, including IS-95, IS-2000, and WCDMA), LTE (long term evolution), or 5G (e.g., ITU IMT-2020).

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

"Archimedes' constant" means the ratio of a circle's circumference to its diameter. Archimedes' constant is sometimes called "pi" or "π". Archimedes' constant is an irrational number that is approximately equal to 3.14159.

"Artificial" means man-made, that is, not occurring in nature.

To say that a calculation is "according to" a first equation means that the calculation includes (a) solving the first equation; or (b) solving a second equation, where the second equation is derived from the first equation. Non-limiting examples of "solving" an equation include solving the equation in closed form or by numerical approximation or by optimization.

As used herein, "acoustic wave", "acoustic signal", "sound wave" and "sound signal" each mean a longitudinal pressure wave. As used herein, an "acoustic wave", "acoustic signal", and "sound wave" may be at any frequency. For instance, an "acoustic signal" may be at a frequency that is audible to unaided human hearing, or may be at any ultrasonic or infrasonic frequency. An "acoustic transmitter" is a transmitter of acoustic signals.

To compute "based on" specified data means to perform a computation that takes the specified data as an input.

A non-limiting example of a surface that is "between" a first medium and a second medium is a surface at which the first medium physically touches the second medium. For instance, the surface of a body of water is "between" the water and air that touches the water. Another non-limiting example of a surface that is "between" a first medium and a second medium is a surface that is located between the first and second media but at which the first and second media do not directly touch each other.

Non-limiting examples of a "camera" include: (a) a digital camera; (b) a digital grayscale camera; (c) a digital color camera; (d) a video camera; (e) a light sensor, imaging sensor, or photodetector; (f) a set or array of light sensors, imaging sensors or photodetectors; (h) a light field camera or plenoptic camera; (i) a time-of-flight camera; and (j) a depth camera. In some cases, a camera includes any computers or circuits that process data captured by the camera.

The term "comprise" (and grammatical variations thereof) shall be construed as if followed by "without limitation". If A comprises B, then A includes B and may include other things.

A digital computer is a non-limiting example of a "computer". An analog computer is a non-limiting example of a "computer". A computer that performs both analog and digital computations is a non-limiting example of a "computer". However, a human is not a "computer", as that term is used herein.

"Computer Tasks" is defined above.

"Defined Term" means a term or phrase that is set forth in quotation marks in this Definitions section.

For an event to occur "during" a time period, it is not necessary that the event occur throughout the entire time period. For example, an event that occurs during only a portion of a given time period occurs "during" the given time period.

The term "e.g." means for example.

Each equation above may be referred to herein by the equation number set forth to the right of the equation. For instance, "Equation 10" means the equation above that has the phrase "(Equation 10)" written to the right of it. Non-limiting examples of an "equation", as that term is used herein, include: (a) an equation that states an equality; (b) an inequation that states an inequality; (c) a mathematical statement of proportionality or inverse proportionality; (d) a system of equations; (e) a mathematical optimization problem; or (f) a mathematical expression.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"Euler's number" means the unique number whose natural logarithm is equal to one. Euler's number is a constant that is approximately equal to 2.71828.

"FMCW" means Frequency Modulated Continuous Wave.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"Medium" means a physical substance through which a signal propagates.

Unless the context clearly indicates otherwise, "or" means and/or. For example, A or B is true if A is true, or B is true, or both A and B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

"Radio frequency" or "RF" means a frequency that is greater than or equal to 3 hertz and less than or equal to 3 terahertz.

"QAM" means quadrature amplitude modulation.

A non-limiting example of a "receiver" is a transceiver.

As used herein, the term "set" does not include a group with no elements.

Unless the context clearly indicates otherwise, "some" means one or more.

As used herein, a "subset" of a set consists of less than all of the elements of the set.

The term "such as" means for example.

A non-limiting example of a "transmitter" is a transceiver.

To say that a machine-readable medium is "transitory" means that the medium is a transitory signal, such as an electromagnetic wave.

"Wind wave" means a water wave that is generated by wind.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; (7) one or more steps occur simultaneously; or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage and any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a system comprising: (a) an underwater acoustic transmitter configured to transmit an acoustic signal that (i) represents data, (ii) travels through water to the water's surface, and (iii) causes displacements in the surface; (b) a radar transceiver configured to take measurements of the displacements by (i) transmitting a wireless signal that propagates through air to the surface, and (ii) measuring a reflected wireless signal that reflects from the surface; and (c) one or more computers that are programmed to determine, based on the measurements of the displacements, at least some of the data that is represented by the acoustic signal. In some cases, the radar transceiver is a millimeter-wave radar. In some cases, the radar transceiver is a frequency modulated continuous wave radar. In some cases, the one or more computers are programmed to determine displacement of the water's surface, based on phase of the reflected wireless signal. In some cases, the one or more computers are programmed: (a) to computationally separate the reflected wireless signal into range bins; and (b) to select a range bin that corresponds to height of the radar transceiver above the water's surface. In some cases, the one or more computers are programmed: (a) to computationally separate the reflected wireless signal into range bins; (b) to select a particular range bin that corresponds to height of the radar transceiver above the water's surface; and (c) to unwrap phase of the reflected wireless signal for the particular range bin. In some cases, the one or more computers are programmed to filter the reflected wireless signal in such a way as to filter out frequencies that are due to wind waves on the water's surface. In some cases, the acoustic transmitter is programmed to modulate the acoustic signal with orthogonal frequency division multiplexing. In some cases: (a) the acoustic transmitter is programmed to frequency modulate the acoustic signal; and (b) the acoustic transmitter is programmed to optimize allocation of signal power among frequency channels. In some cases, the acoustic transmitter is programmed to adjust a modulation scheme, bitrate, or coding rate for a particular frequency channel of communication, based on an estimate (i) of power, amplitude, attenuation or signal-to-noise ratio (SNR) of the particular channel, or (iii) of any parameter that is positively correlated with the power, the amplitude, the attenuation or the SNR. In some cases: (a) the system further comprises a pressure sensor that is configured to measure water pressure and to determine, based on the pressure, depth of the pressure sensor below the water's surface; and (b) the acoustic transmitter is programmed (i) to estimate, based on the depth, a value that represents power, amplitude, attenuation or signal-to-noise ratio of a channel of communication. In some cases: (a) the system includes one or more hydrophones that are configured to take measurements of sound signals that have reflected from the water's surface; and (b) the system includes one or more computers that are programmed to estimate, based on the measurements, a value that represents power, amplitude, attenuation or signal-to-noise ratio of a channel of communication. In some cases, the one or more computers are programmed to estimate horizontal location of the acoustic transmitter, based on where amplitude of the displacements is greatest. Each of the cases described above in this paragraph is an example of the system described in the first sentence of this paragraph, and is also an example of an embodiment of this invention that may be combined with other embodiments of this invention.

In some implementations, this invention is a system comprising: (a) an artificial acoustic transmitter configured to transmit an acoustic signal that (i) represents data, (ii) propagates through at least a first medium to a surface that is between the first medium and a second medium, and (iii) causes displacements of the surface; (b) a radar transceiver configured to take measurements of the displacements by (i) transmitting a wireless signal that propagates through the second medium to the surface, and (ii) measuring a reflected wireless signal that reflects from the surface; and (c) one or more computers that are programmed to determine, based on the measurements of the displacements, at least some of the data that is represented by the acoustic signal. In some cases: (a) the first medium comprises bodily tissue; and (b) the surface comprises skin. In some cases, the first medium comprises a liquid in a well. Each of the cases described above in this paragraph is an example of the system described in the first sentence of this paragraph, and is also an example of an embodiment of this invention that may be combined with other embodiments of this invention.

In some implementations, this invention is a system comprising: (a) an artificial acoustic transmitter configured to transmit an acoustic signal that (i) represents data, (ii) propagates through at least a first medium to a surface a surface that is between the first medium and a second medium and (iii) causes displacements of the surface; (b) a sensor configured to take measurements of the displacements by measuring a reflected wireless electromagnetic signal that reflects from the surface and propagates through the second medium; and (c) one or more computers that are programmed to determine, based on the measurements of the displacements, at least some of the data that is represented by the acoustic signal. In some cases, the electromagnetic signal is collimated. In some cases, the electromagnetic signal comprises visible light. In some cases, the electromagnetic signal comprises infrared light. In some cases, the system further comprises a source of the electromagnetic radiation. Each of the cases described above in this paragraph is an example of the system described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure, diagram, schematic or drawing herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including hardware, hardware components, methods, processes, steps, software, algorithms, features, or technology) that are described herein.

What is claimed:

1. A system comprising:
   (a) an underwater acoustic transmitter configured to emit, while immersed in water below the water's surface, an acoustic signal that (i) encodes data when the signal is emitted, (ii) travels through the water to the water's surface, and (iii) causes displacements in the water's surface, which water's surface is an interface between the water and air;
   (b) a radar transceiver configured to take measurements of the displacements by (i) transmitting a wireless signal that propagates through the air to the water's surface, and (ii) measuring a reflected wireless signal that reflects from the water's surface; and
   (c) one or more computers that are programmed to decode, based on the measurements of the displacements, at least some of the data that is encoded by the transmitter in the acoustic signal;
   wherein the acoustic transmitter is programmed
   (i) to frequency modulate the acoustic signal,
   (ii) to calculate optimal power levels for respective frequency channels by performing, for each of the frequency channels, a computation that includes: (i) solving for a real positive root of a polynomial, which polynomial includes variables, which variables include water density, speed of sound in water, and noise as a function of frequency, and (ii) calculating a difference equal to the real positive root minus the noise as a function of frequency, and
   (iii) to optimize allocation of signal power among the frequency channels, based on the optimal power levels.

2. A system comprising:
   (a) an underwater acoustic transmitter configured to emit, while immersed in water below the water's surface, an acoustic signal that (i) encodes data when the signal is emitted, (ii) travels through the water to the water's surface, and (iii) causes displacements in the water's surface, which water's surface is an interface between the water and air;
   (b) a radar transceiver configured to take measurements of the displacements by (i) transmitting a wireless signal that propagates through the air to the water's surface, and (ii) measuring a reflected wireless signal that reflects from the water's surface; and
   (c) one or more computers that are programmed to decode, based on the measurements of the displacements, at least some of the data that is encoded by the transmitter in the acoustic signal;
   wherein the acoustic transmitter is programmed to adjust a modulation scheme for a particular frequency channel of communication, based on an estimate of a signal-to-noise ratio of the particular channel.

* * * * *